United States Patent [19]

Chida et al.

[11] Patent Number: 4,797,143
[45] Date of Patent: Jan. 10, 1989

[54] PROCESS FOR THE PRODUCTION OF OPTICAL FIBER PREFORMS

[75] Inventors: Kazunori Chida, Ibaraki; Hiroshi Yokota, Kanagawa; Michihisa Kyoto, Kanagawa; Hisao Sato, Kanagawa; Minoru Watanabe, Kanagawa; Naoki Yoshioka, Kanagawa, all of Japan

[73] Assignees: Nippon Telegraph & Telephone Public Corporation, Tokyo; Sumitomo Electric Industries, Ltd., Osaka, both of Japan

[21] Appl. No.: 781,182

[22] Filed: Jul. 19, 1985

Related U.S. Application Data

[63] Continuation of Ser. No. 473,420, Mar. 9, 1983, abandoned.

[30] Foreign Application Priority Data

Mar. 12, 1982 [JP] Japan ................... 57-38094

[51] Int. Cl.⁴ ........................................... C03B 37/018
[52] U.S. Cl. ....................................... 65/3.12; 65/3.11; 65/13; 65/18.2
[58] Field of Search ............... 65/3.12, 13, 18.2, 29, 65/3.11

[56] References Cited

U.S. PATENT DOCUMENTS 4,062,665 12/1977 Izawa et al. ................. 65/3.12
4,378,985 4/1983 Powers ........................ 65/3.12
4,419,116 12/1983 Nakahar et al. ............ 65/3.12

FOREIGN PATENT DOCUMENTS 7022134 2/1982 Japan ....................... 65/3.12

OTHER PUBLICATIONS

Sudo et al. "Transactions of the IECE of Japan, vol. 64, No. 8, Aug. 81, pp. 532-543.

Primary Examiner—Arthur Kellogg
Attorney, Agent, or Firm—Sughrue, Mion, Zinn, Macpeak & Seas

[57] ABSTRACT

An improved process for the production of optical fiber porous preforms of predetermined refractive index distribution by the vapor-phase deposition method is disclosed wherein a glass material and a dopant material are subjected to flame oxidation by the use of an oxyhydrogen burner to form fine glass particles which are deposited on one end of a supporting rod adapted to move apart from the oxyhydrogen burner while rotating to allow a rod-like porous preform to grow thereon. The improved process is characterized in that the correlation between the shape of the deposition face and the refractive index distribution is previously determined mathematically, and on a basis of the correlation therebetween, a process variable such as the distance between the porous preform and the burner is adjusted to produce the desired shape of the deposition face whereby there can be obtained an optimum refractive index distribution.

16 Claims, 3 Drawing Sheets

PROCESS FOR THE PRODUCTION OF OPTICAL FIBER PREFORMS

This application is a continuation of Ser. No. 473,420 filed Mar. 9, 1983, now abandoned.

BACKGROUND OF THE INVENTION

The present invention relates to a process for the production of optical fiber preforms by vapor-phase axial deposition, and more particularly, to a process for the production of optical fiber preforms having an optimum graded index distribution.

A vapor-phase axial deposition process is among the techniques for producing silica-base glass fibers which when used as low loss fibers for communication.

FIG. 1 of the Drawing diagrammatically illustrates the principles of production of optical fiber preforms by the vapor-phase deposition process. Referring to FIG. 1, a glass material, such as $SiCl_4$, and a refractive index-controlling material (a dopant), such as $GeCl_4$, which is used to change the refractive index of the glass material, are discharged from an oxyhydrogen burner 2 placed at a lower end portion of a protective container 1 made of, e.g., quartz or Pyrex glass, and are subjected to a hydrolytic reaction to form fine particles of glass. The thus-formed fine glass particles are deposited on a supporting rod 3 so as to form a predetermined space distribution thereof to form a porous preform 4. Further, the porous preform 4 is sintered and vitrified by heating at a temperature of from 1,450° to 1,700° C. by means of a high temperature heat generator 5 to obtain an optical fiber preform 6. In the production of the optical fiber preform 6 by the vapor-phase axial deposition process, as the operation proceeds, the clearance between a deposition face 7 appearing on the lower end of the porous preform 4 and the oxyhydrogen burner 2 gradually decreases, changing the space distribution of each of the glass material and the dopant material. Therefore, in order to maintain a constant clearance, the production system is designed so that the porous preform 4 moves upward while rotating with the growth thereof. However, it has been difficult to produce a preform having a desired refractive index distribution by merely attempting to maintain a constant clearance between the burner and the deposition face of the preform.

SUMMARY OF THE INVENTION

Therefore it is an object of the present invention to provide optical fiber preforms having a desired refractive index distribution and a process for producing the same.

A more specific object of the present invention is to provide an improved vapor-phase deposition method for producing optical fiber porous preforms characterized by a predetermined refractive index distribution.

In accordance with the present invention, it has been found that the desired refractive index distribution can be obtained by controlling the shape or profile of a deposition face of the preform by utilizing a correlation between refractive index and shape of the deposition face as previously determined, particularly by utilizing a mathematical correlation or relationship between refractive index and shape of the deposition face.

More specifically, the present invention relates to a process for producing a graded index optical fiber porous preform by the vapor-phase axial deposition method wherein a glass material and a dopant material, said dopant material being used to change the refractive index of the glass material, are subjected to flame oxidation by the use of an oxyhydrogen burner to form fine glass particles, and the particles are then deposited on one end of a supporting rod adapted to move apart from the oxyhydrogen burner while rotating to allow a rod-like porous preform to grow thereon, which process is characterized in that a relationship, particularly of a mathematical nature, is determined between shape of the deposition face of the preform and refractive index and then the shape of the deposition face is controlled during one or more portions of the process to provide predetermined refractive index values during said one or more portions of the process. In a preferred embodiment, the correlation between a function approximately representing the shape of a deposition face on the end of the porous preform with the distance in radial direction from the center of the deposition face as a variable and a function representing the refractive index distribution in radial direction of the optical fiber preform with the distance in radial direction from the center of the optical fiber preform as a variable is previously determined and on the basis of the correlation between the two functions, the optimum shape of the deposition face is determined; and the deposition process is carried out so that the deposition face has the optimum shape.

DETAILED DESCRIPTION OF THE INVENTION

Figure 1:
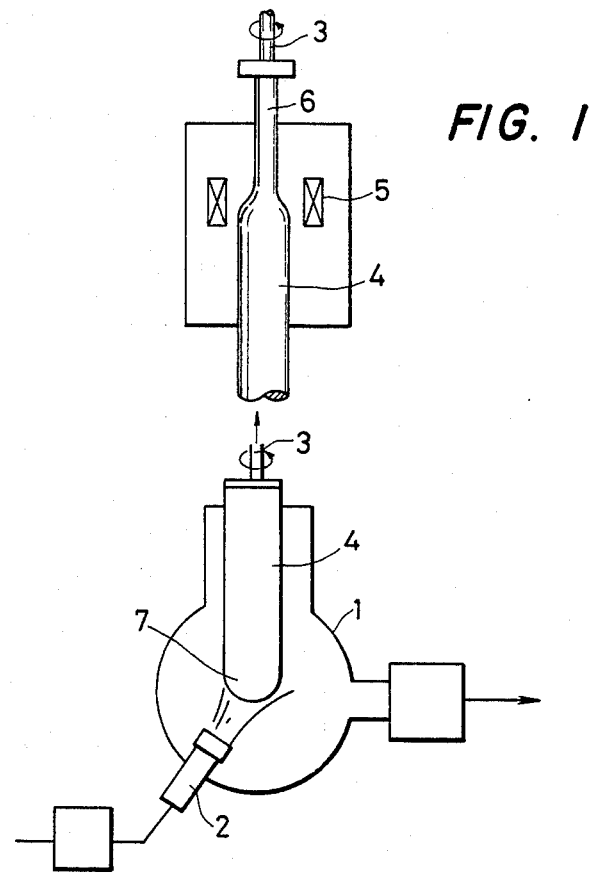
FIG. 1 of the Drawing diagrammatically illustrates a vapor-phase axial deposition process for production of optical fiber preforms.
Figure 2:
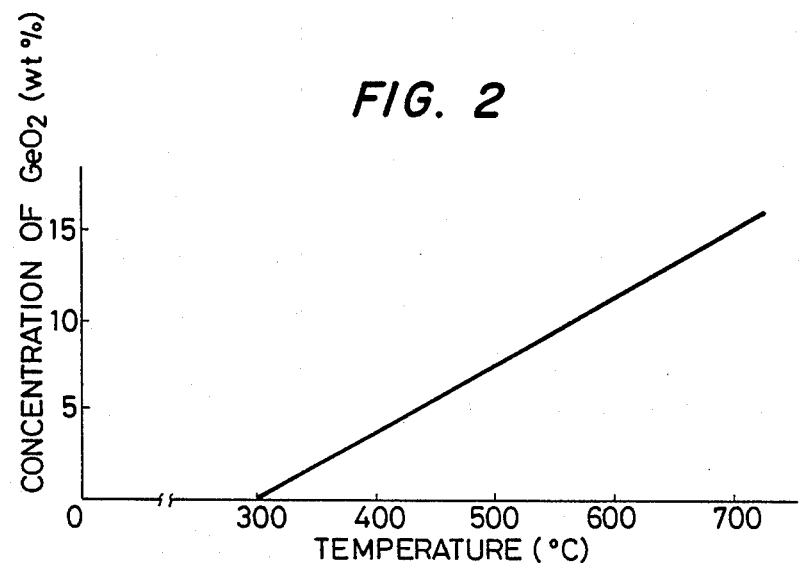
FIG. 2 of the Drawing is a graph of the relation between concentration of dopant and temperature in the vapor-phase deposition process.

In order to provide the optical fiber preform 6 with a desired refractive index distribution, it is necessary to pay great attention to the distribution of the dopant to be deposited on the surface of the porous preform 4. FIG. 2 shows the relation between the concentration of the dopant and the temperature of the deposition face of the porous preform 4. As can be seen from FIG. 2, the deposition of the dopant, such as $GeO_2$, proceeds proportionally in relation to the surface temperature of the deposition face. Thus, temperature variation exerts a great influence on the refractive index distribution. However, it is difficult to directly know the temperature variation of the deposition face during the course of production of the porous preform.

The relation between the shape of the deposition face of the porous preform and the refractive index distribution has been examined with the following results.

Figure 3A:
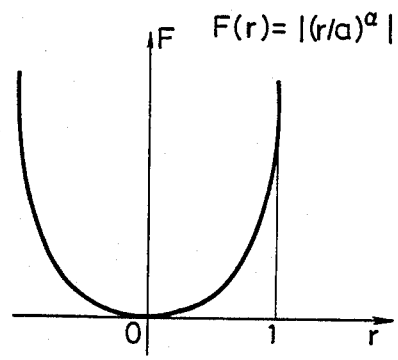
FIGS. 3(a) and 4(a) of the Drawing each illustrate the shape of a deposition face of a porous preform in the course of the production thereof.

The shape of the deposition face of the porous preform growing in a prefixed form is photographed, and its outline is drawn and diagrammed (see FIG. 3(a)). This is approximated by the function:

$$F(r) = |(r/a)^\alpha|$$

Figure 3B:
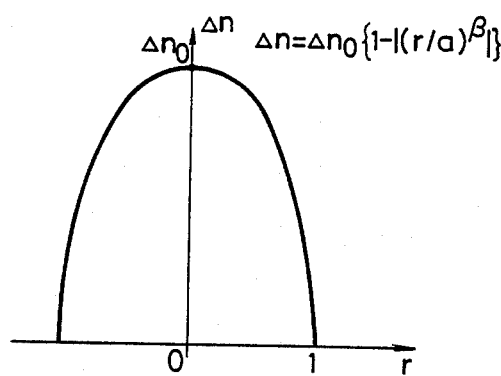
FIGS. 3(b) and 4(b) of the Drawing show the refractive index distributions of optical fiber preforms produced while maintaining the shapes of FIGS. 3(a) and 4(a), respectively.
Figure 4B:
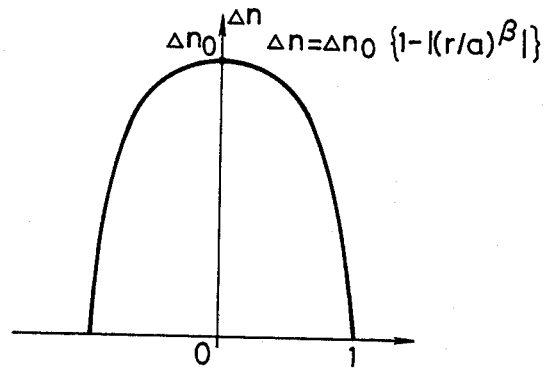

(wherein a represents the maximum radius, r represents an arbitrary radius, and $0 \leq |r| \leq a$). The exponent $\alpha$ is then determined. A porous preform produced while maintaining the shape of the deposition face as shown in FIG. 3(a) is subjected to a consolidation treatment to form an optical fiber preform, and the refractive index distribution of the optical fiber preform is measured with the results shown in FIG. 3(b). This curve is represented by the function:

$$\Delta n(r) = \Delta n_0 \{1 - |(r/a)^\beta|\}$$

(wherein $\Delta n_0$ represents the maximum refractive index difference; i.e., the difference in refractive index between a $GeO_2$ concentration of 0 wt% and a $GeO_2$ concentration of 15 wt%). The exponent $\beta$ is then determined.

Figure 4A:
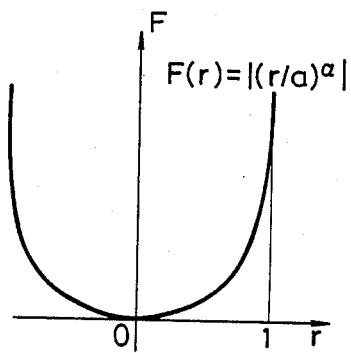

In connection with an optical fiber preform which is produced while maintaining the shape of the deposition face as shown in FIG. 4(a), which is different from that in FIG. 3(a), the values of the exponents $\alpha$ and $\beta$ are determined in the same manner as described above.

Figure 5:
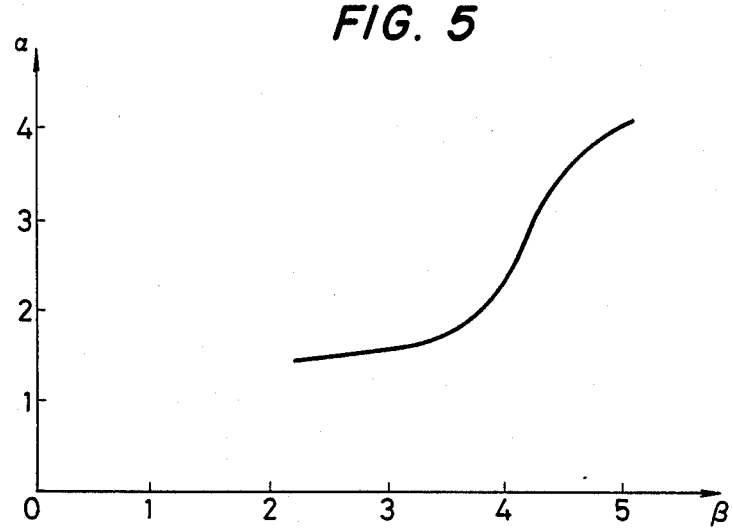
FIG. 5 of the Drawing is a graph of the relation between the exponents and of the functions determined by the curves of FIGS. 3(a) and 4(a), and 3(b) and 4(b)

On the basis of a number of experimental results, the relation between the exponents $\alpha$ and $\beta$; that is, the relation between the shape of the deposition face and the corresponding refractive index distribution, is determined and is shown in FIG. 5. Thus, it has now been found that there is a certain correlation between the shape of the deposition face and the refractive index distribution.

The ideal refractive index distribution of graded type optical fiber preforms is a near-parabolic distribution. The corresponding $\alpha$ value can be determined according to a graph of the type as illustrated by FIG. 5. Accordingly, by using the $\alpha$ value, the ideal shape of the deposition face (approximately represented by the function:

$$F(r) = |(r/a)^\alpha|$$

wherein $0 \leq |r| \leq a$) can be determined. This ideal shape information can be stored in a computer. The deviation of the actual shape of the deposition face monitored by a TV set from the ideal shape is adjusted by moving the position of the oxyhydrogen burner, whereby the ideal refractive index distribution is obtained. Of course, the adjustment of the deviation can be achieved by moving the porous preform, or by moving both the porous preform and the burner. Moreover, the deviation can be adjusted by controlling the amount of gases discharged from the oxyhydrogen burner, for example, by increasing or decreasing dopant amount. Examination of optical fiber preforms produced by the above-described method shows that there can be obtained desirable mean values, e.g., a band width of 800 MHzkm at a light wavelength of 0.85 μm and a band width of 850 light wavelength of MHzKm at a 1.30 μm.

For comparison, ten optical fiber preforms were produced without controlling the shape of the deposition face. With these comparative preforms, the band width characteristics were evaluated with the results that the band average widths were 430 MHzkm at a light wavelength of 0.85 μm, and 520 MHzkm at a light wavelength of 1.3 μm. As can be seen from these results, the process of the invention enables one to produce optical fiber preforms having greatly improved band width characteristics.

It has further been found that irrespective of the control of shape of the deposition face of the porous preform, the temperature distribution of the deposition face is in proportion to the distance of the deposition face from the oxyhydrogen burner. It has already been known that as shown in FIG. 2, the dopant (such as $GeO_2$) concentration is in proportion to the temperature, and the ideal refractive index distribution is represented by the function:

$$\Delta n(r) = \Delta n_0 \{1 - |(r/a^{\beta opt})|\} \beta opt \approx 2.$$

Figure 6A:
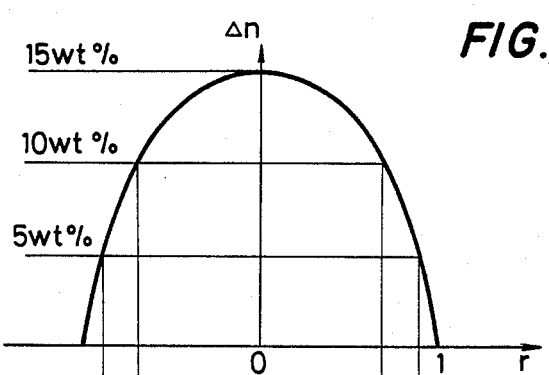
FIG. 6(a) of the Drawing illustrates an ideal refractive index distribution of a vapor-phase deposited preform.
Figure 6B:
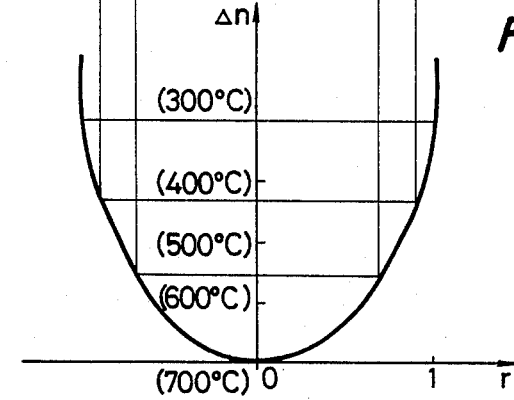
FIG. 6(b) of the Drawing illustrates an ideal shape of a deposition face of a vapor-phase deposited preform corresponding to the ideal refractive index distribution of FIG. 6(a).

Accordingly, on basis of the diagram of the function shown in FIG. 6(a) and the diagram of FIG. 2, there can be drawn the ideal diagram of the deposition face as shown in FIG. 6(b) with the temperature distribution as ordinate. Therefore, when the value of the exponent $\beta$ is determined, the coordinate of the lengthwise direction to the radial direction in the shape of the deposition face shown in FIG. 6(b) can be determined. On the basis of this coordinate, the shape of the deposition face can be controlled to obtain the ideal refractive index distribution.

Although the diagrams are represented by the high order functions in the above explanation, they may be represented by polynomial functions, etc.

The shape of the deposition face according to the process of the invention can be controlled by various known techniques. In accordance with the process of this invention, as described above, the oxyhydrogen burner or porous preform can be moved or controlled in position while monitoring the shape of the deposition face of the porous preform so that an optimum refractive index distribution is produced in the deposition face. Thus, the process of the invention enables one to produce optical fiber preforms having a uniform and optimum refractive index distribution.

Variations of the invention will be apparent to the skilled artisan. For example, other glasses and dopants to modify (reduce or increase) refractive index used in the vapor-phase deposition process can be employed in accordance with the invention herein to enjoy the benefits flowing from the present invention. Other dopants usable in the present invention are $GeO_2P_2O_5$, $ZrO_2$, $Sb_2O_3$, $Al_2O_3$, $SnO_2$, $B_2O_3$ and F.

We claim:

1. A process for producing an optical fiber porous preform having a predetermined refractive index distribution by a vapor-phase axial deposition method in which a glass material and a refractive index changing dopant material are subjected to flame oxidation by use of an oxyhydrogen burner to form fine glass particles deposited on one end of a supporting rod adapted to move apart from the oxyhydrogen burner while rotating to allow a rod-like porous preform to grow thereon, the improvement which comprises; determining a relationship between shape of the deposition face of the preform and refractive index and, controlling the shape of the deposition face of said preform during growth thereof to provide a predetermined refractive index to the preform based on said relationship.

2. The process of claim 1 wherein the shape of the deposition face is continuously monitored during the process and when said shape deviates from a predetermined shape needed to provide a predetermined refractive index, at least one deposition face shape-affecting process variable is adjusted to correct said deviation, thereby to form said predetermined shape.

3. The process of claim 2 wherein the distance between the porous preform and the oxyhydrogen burner is adjusted to maintain said predetermined shape.

4. The process of claim 3 wherein the porous preform is moved.

5. The process of claim 3 wherein the oxyhydrogen burner is moved.

6. The process of claim 2 wherein the amount of gases discharged from the oxyhydrogen burner is controlled to maintain said predetermined shape.

7. The process of claim 3 wherein both the porous preform and the oxyhydrogen burner are moved.

8. The process of claim 1 wherein a correlation between a function approximately representing the shape of a deposition face on the end of the porous preform with the distance in radial direction from the center of the deposition face as a variable and a function representing the refractive index distribution in radial direction of the optical fiber preform with the distance in radial direction from the center of the optical fiber preform as a variable are determined and on the basis of the correlation between the two functions, the final shape of the deposition face is determined and the process is carried out until the deposition face has the final shape.

9. The process of claim 1 wherein as an additional process step, the optical fiber porous preform is consolidated to form an optical fiber preform.

10. The process of claim 2 wherein as an additional process step, the optical fiber porous preform is consolidated to form an optical fiber preform.

11. The process of claim 3 wherein as an additional process step, the optical fiber porous preform is consolidated to form an optical fiber preform.

12. The process of claim 4 wherein as an additional process step, the optical fiber porous preform is consolidated to form an optical fiber preform.

13. The process of claim 5 wherein as an additional process step, the optical fiber porous preform is consolidated to form an optical fiber preform.

14. The process of claim 6 wherein as an additional process step, the optical fiber porous preform is consolidated to form an optical fiber preform.

15. The process of claim 7 wherein as an additional process step, the optical fiber porous preform is consolidated to form an optical fiber preform.

16. The process of claim 8 wherein as an additional process step, the optical fiber porous preform is consolidated to form an optical fiber preform.

* * * * *